(12) United States Patent
Lindström et al.

(10) Patent No.: US 10,081,348 B2
(45) Date of Patent: *Sep. 25, 2018

(54) METHOD OF UNLOCKING A PLANETARY GEARING WHEN DRIVING A VEHICLE

(71) Applicant: Scania CV AB, Södertälje (SE)

(72) Inventors: Johan Lindström, Nyköping (SE); Mathias Björkman, Tullinge (SE); Mikael Bergquist, Huddinge (SE); Niklas Pettersson, Stockholm (SE)

(73) Assignee: Scania CV AB, Södertälje (SE)

( * ) Notice: Subject to any disclaimer, the term of this patent is extended or adjusted under 35 U.S.C. 154(b) by 186 days.

This patent is subject to a terminal disclaimer.

(21) Appl. No.: 15/106,824

(22) PCT Filed: Dec. 23, 2014

(86) PCT No.: PCT/SE2014/051565
§ 371 (c)(1),
(2) Date: Jun. 20, 2016

(87) PCT Pub. No.: WO2015/099595
PCT Pub. Date: Jul. 2, 2015

(65) Prior Publication Data
US 2017/0001627 A1   Jan. 5, 2017

(30) Foreign Application Priority Data

Dec. 23, 2013   (SE) ...................................... 1351574

(51) Int. Cl.
*B60W 20/00* (2016.01)
*B60K 1/02* (2006.01)
(Continued)

(52) U.S. Cl.
CPC ............... *B60W 20/00* (2013.01); *B60K 1/02* (2013.01); *B60K 6/365* (2013.01); *B60K 6/387* (2013.01);
(Continued)

(58) Field of Classification Search
CPC ...... B60W 20/00; B60W 20/15; B60W 10/02; B60W 20/10; B60K 1/02; B60K 6/365;
(Continued)

(56) References Cited

U.S. PATENT DOCUMENTS 5,433,282 A * 7/1995 Moroto .................. B60K 6/365
  180/65.21
5,492,189 A  2/1996 Kriegler et al.
(Continued)

FOREIGN PATENT DOCUMENTS

DE  19628000 A1  1/1997
DE  19838853 A1  3/1999
(Continued)

OTHER PUBLICATIONS

International Search Report for PCT/SE2014/051565 dated Apr. 23, 2015.
(Continued)

*Primary Examiner* — Gertrude Arthur Jeanglaud
(74) *Attorney, Agent, or Firm* — Moore & Van Allen PLLC; W. Kevin Ransom

(57) ABSTRACT

In a method for controlling a vehicle with a drive system comprising a power unit configuration adapted to provide output for the vehicle's operation, and further comprising a planetary gear and a first and second electrical machine, connected to components in the planetary gear via their rotors, a locking means is moved from a locked position, in which two of the planetary gear's components are locked together, so that the three components of the planetary gear
(Continued)

rotate with the same speed, to a release position, when the vehicle is driven with the locking means in a locked position, by carrying out the following method steps. The power unit configuration is controlled in order to achieve torque balance between the components that are locked together by the locking means, and such locking means are moved into a release position, when said torque balance prevails.

14 Claims, 6 Drawing Sheets

(51) Int. Cl.
| | |
|---|---|
| B60K 6/365 | (2007.10) |
| B60K 6/387 | (2007.10) |
| B60K 6/40 | (2007.10) |
| B60W 10/02 | (2006.01) |
| B60W 10/06 | (2006.01) |
| B60W 10/08 | (2006.01) |
| B60W 30/18 | (2012.01) |
| B60W 20/20 | (2016.01) |
| B60K 6/46 | (2007.10) |
| B60W 10/115 | (2012.01) |
| B60W 20/40 | (2016.01) |
| B60W 20/15 | (2016.01) |
| F16H 3/72 | (2006.01) |
| F02D 41/06 | (2006.01) |
| F02D 41/26 | (2006.01) |
| F02D 41/30 | (2006.01) |
| B60K 6/44 | (2007.10) |
| B60W 20/30 | (2016.01) |
| F02D 41/04 | (2006.01) |
| B60W 10/12 | (2012.01) |
| B60W 20/10 | (2016.01) |
| B60K 6/445 | (2007.10) |
| B60K 6/48 | (2007.10) |
| B60K 17/02 | (2006.01) |
| B60W 30/188 | (2012.01) |
| B60L 11/00 | (2006.01) |
| B60K 6/547 | (2007.10) |
| B60W 10/10 | (2012.01) |

(52) U.S. Cl.
CPC .................. *B60K 6/40* (2013.01); *B60K 6/44* (2013.01); *B60K 6/445* (2013.01); *B60K 6/46* (2013.01); *B60K 6/48* (2013.01); *B60K 17/02* (2013.01); *B60W 10/02* (2013.01); *B60W 10/06* (2013.01); *B60W 10/08* (2013.01); *B60W 10/115* (2013.01); *B60W 10/12* (2013.01); *B60W 20/10* (2013.01); *B60W 20/15* (2016.01); *B60W 20/20* (2013.01); *B60W 20/30* (2013.01); *B60W 20/40* (2013.01); *B60W 30/18* (2013.01); *B60W 30/181* (2013.01); *B60W 30/18027* (2013.01); *B60W 30/1886* (2013.01); *B60W 30/18109* (2013.01); *F02D 41/042* (2013.01); *F02D 41/062* (2013.01); *F02D 41/26* (2013.01); *F02D 41/3005* (2013.01); *F16H 3/728* (2013.01); *B60K 6/547* (2013.01); *B60W 10/10* (2013.01); *B60W 30/18009* (2013.01); *B60W 2400/00* (2013.01); *B60W 2510/125* (2013.01); *B60W 2520/40* (2013.01); *B60W 2710/021* (2013.01); *B60W 2710/06* (2013.01); *B60W 2710/0644* (2013.01); *B60W 2710/081* (2013.01); *B60W 2710/083* (2013.01); *B60W 2710/105* (2013.01); *B60W 2710/1038* (2013.01); *B60W 2710/125* (2013.01); *B60W 2710/248* (2013.01); *B60W 2710/30* (2013.01); *B60W 2710/305* (2013.01); *B60W 2720/40* (2013.01); *B60Y 2200/92* (2013.01); *B60Y 2300/18* (2013.01); *B60Y 2300/188* (2013.01); *B60Y 2300/18025* (2013.01); *B60Y 2300/18091* (2013.01); *B60Y 2300/19* (2013.01); *B60Y 2300/43* (2013.01); *B60Y 2300/60* (2013.01); *B60Y 2300/78* (2013.01); *B60Y 2300/84* (2013.01); *B60Y 2400/73* (2013.01); *Y02T 10/6221* (2013.01); *Y02T 10/6239* (2013.01); *Y02T 10/6286* (2013.01); *Y10S 903/903* (2013.01); *Y10S 903/91* (2013.01); *Y10S 903/93* (2013.01); *Y10S 903/945* (2013.01)

(58) Field of Classification Search
CPC .......... B60K 6/387; B60K 6/40; B60K 6/445; B60K 6/44; B60K 6/46; B60K 6/48; B60K 17/02
USPC .......................................... 701/22; 180/65.25
See application file for complete search history.

(56) References Cited

U.S. PATENT DOCUMENTS

| | | | |
|---|---|---|---|
| 5,508,574 | A * | 4/1996 | Vlock .................... B60K 6/445 310/113 |
| 6,018,198 | A | 1/2000 | Tsuzuki et al. |
| 6,354,974 | B1 | 3/2002 | Kozarekar |
| 6,579,201 | B2 | 6/2003 | Bowen |
| 7,237,634 | B2 | 7/2007 | Severinsky et al. |
| 7,282,008 | B2 | 10/2007 | Oshidari |
| 8,182,391 | B2 | 5/2012 | Klemen et al. |
| 8,403,807 | B2 | 3/2013 | Tabata et al. |
| 8,500,589 | B2 | 8/2013 | Ortmann et al. |
| 8,840,502 | B2 | 9/2014 | Bergquist |
| 8,905,892 | B1 | 12/2014 | Lee et al. |
| 9,139,076 | B2 | 9/2015 | Lee et al. |
| 9,266,418 | B2 | 2/2016 | Lee et al. |
| 9,327,716 | B2 | 5/2016 | Pettersson et al. |
| 9,441,708 | B2 | 9/2016 | Kimes et al. |
| 9,592,821 | B2 | 3/2017 | Pettersson et al. |
| 9,643,481 | B2 | 5/2017 | Goleski et al. |
| 9,937,920 | B2 | 4/2018 | Lindstrom et al. |
| 2005/0049100 | A1 | 3/2005 | Ai et al. |
| 2007/0056784 | A1 | 3/2007 | Joe et al. |
| 2007/0102209 | A1 | 5/2007 | Doebereiner |
| 2008/0009380 | A1 | 1/2008 | Iwanaka et al. |
| 2008/0081734 | A1 | 4/2008 | Duffy et al. |
| 2008/0318728 | A1 | 12/2008 | Soliman et al. |
| 2009/0075779 | A1 | 3/2009 | Kumazaki et al. |
| 2009/0076694 | A1 | 3/2009 | Tabata et al. |
| 2009/0145673 | A1 | 6/2009 | Soliman et al. |
| 2010/0099532 | A1 | 4/2010 | Cashen |
| 2012/0028757 | A1 | 2/2012 | Kimura et al. |
| 2012/0197475 | A1 | 8/2012 | Akutsu et al. |
| 2013/0102429 | A1 | 4/2013 | Kaltenbach et al. |
| 2013/0109530 | A1 | 5/2013 | Kaltenbach et al. |
| 2013/0316865 | A1 | 11/2013 | Engström et al. |
| 2014/0024490 | A1 | 1/2014 | Bangura et al. |
| 2014/0051537 | A1 | 2/2014 | Liu et al. |
| 2014/0243149 | A1 | 8/2014 | Holmes et al. |
| 2015/0149012 | A1 | 5/2015 | Pettersson et al. |
| 2015/0239459 | A1 | 8/2015 | Pettersson et al. |
| 2015/0375734 | A1 | 12/2015 | Pettersson et al. |
| 2016/0052381 | A1 | 2/2016 | Kaltenbach et al. |
| 2016/0159344 | A1 | 6/2016 | Hata et al. |
| 2016/0176396 | A1 | 6/2016 | Hata et al. |
| 2016/0288784 | A1 | 10/2016 | Teraya et al. |
| 2017/0001622 | A1 | 1/2017 | Lindstrom et al. |
| 2017/0001634 | A1 | 1/2017 | Lindstrom et al. |
| 2017/0043763 | A1 | 2/2017 | Ketfi-Cherif et al. |

(56) References Cited

U.S. PATENT DOCUMENTS

2017/0144649 A1 5/2017 Bangura et al.
2017/0282702 A1 10/2017 Kim

FOREIGN PATENT DOCUMENTS

| | | |
|---|---|---|
| DE | 19841829 A1 | 3/2000 |
| DE | 102006054405 A1 | 6/2008 |
| DE | 102007004458 A1 | 7/2008 |
| DE | 102007004464 A1 | 7/2008 |
| DE | 19628000 B4 | 1/2010 |
| DE | 19838853 B4 | 11/2013 |
| EP | 552140 A1 | 10/1995 |
| EP | 552140 B1 | 10/1995 |
| EP | 1145896 A1 | 10/2001 |
| EP | 769404 A1 | 12/2001 |
| EP | 1304249 A2 | 4/2003 |
| EP | 1319546 A1 | 9/2004 |
| EP | 1319546 B1 | 9/2004 |
| EP | 2436546 A1 | 4/2012 |
| FR | 2832356 A1 | 5/2003 |
| JP | 07135701 A | 5/1995 |
| JP | 11332018 A | 11/1999 |
| JP | 3291871 B2 | 6/2002 |
| SE | 1051384 A1 | 6/2012 |
| SE | 536329 C2 | 8/2013 |
| SE | 1200390 A1 | 12/2013 |
| SE | 1200394 A1 | 12/2013 |
| SE | 1250696 A1 | 12/2013 |
| SE | 1250698 A1 | 12/2013 |
| SE | 1250699 A1 | 12/2013 |
| SE | 1250700 A1 | 12/2013 |
| SE | 1250702 A1 | 12/2013 |
| SE | 1250706 A1 | 12/2013 |
| SE | 1250708 A1 | 12/2013 |
| SE | 1250711 A1 | 12/2013 |
| SE | 1250716 A1 | 12/2013 |
| SE | 1250717 A1 | 12/2013 |
| SE | 1250718 A1 | 12/2013 |
| SE | 1250720 A1 | 12/2013 |
| SE | 536559 C2 | 2/2014 |
| WO | 0006407 A1 | 2/2000 |
| WO | 2007113438 A1 | 10/2007 |
| WO | 2008016357 A2 | 2/2008 |
| WO | 2012091659 A1 | 7/2012 |
| WO | 2013002707 A1 | 1/2013 |

OTHER PUBLICATIONS

Written Opinion of the International Search Authority for PCT/SE14/051565 dated Apr. 24, 2015.

* cited by examiner

METHOD OF UNLOCKING A PLANETARY GEARING WHEN DRIVING A VEHICLE

CROSS-REFERENCE TO RELATED APPLICATIONS

This application is a national stage application (filed under 35 § U.S.C. 371) of PCT/SE2014/051565, filed Dec. 23, 2014 of the same title, which, in turn, claims priority to Swedish Application No. 1351574-7, filed Dec. 23, 2013; the contents of each of which are hereby incorporated by reference.

FIELD OF THE INVENTION

The present invention relates to a method for controlling a vehicle, and is particularly, but not exclusively, focused on the performance of such a method in motor vehicles in the form of wheeled commercial vehicles, especially heavy goods vehicles, such as trucks and buses. The invention thus relates to a method carried out in a purely electrically powered vehicle or a hybrid vehicle, which, generally, is a vehicle that may be powered by a primary engine, e.g. a combustion engine, and a secondary engine, such as at least one electrical machine. The vehicle is suitably, but for the purposes of the present invention not necessarily, equipped with means for storage of electric energy, such as a battery or a capacitor for storage of electric energy, and control equipment to control the flow of electric energy between the means and the electrical machine. The electrical machine(s) may in such a case alternately operate as an engine or as a generator, depending on the vehicle's operating mode. When the vehicle decelerates, the electrical machine generates energy that may be stored, and the stored electric energy is used later for e.g. operation of the vehicle.

BACKGROUND OF THE INVENTION

Using a conventional clutch mechanism where a combustion engine is comprised in the drive system's power unit configuration, disconnecting the gearbox's input shaft from the combustion engine during a shifting process in the gearbox, entails disadvantages, such as heating of the clutch mechanism's plates, which results in an increased fuel consumption and wear of the clutch plates. There are also large losses as a result, in particular when the vehicle is started. A conventional clutch mechanism is also relatively heavy and costly. It also occupies a relatively large space in the vehicle. Friction losses also arise from the use of a hydraulic converter/torque converter commonly used in automatic transmissions. By ensuring that the vehicle has a drive system in which the output shaft of the combustion engine, the rotor of the electrical machine and the input shaft of the gearbox are connected with a planetary gear, the conventional clutch mechanism and the disadvantages associated therewith may be avoided. A vehicle with a drive system of this type constitutes prior art, as set out in EP 1 319 546 and SE 536 329.

Certainly, a range of advantageous methods to control a vehicle with a drive system of the type described in SE 536 329 constitute prior art, however there is naturally a constant endeavor to improve the manner of controlling such vehicles, especially in certain specific operating situations.

SUMMARY OF THE INVENTION

The objective of the present invention is to show a method of the type defined above, which is in line with the above-mentioned endeavor. This objective is achieved according to the invention by providing a method according to the enclosed claim 1.

Having a drive system in a vehicle with a power unit configuration including a second electrical machine opens up a possibility for an improved behavior in a range of operational situations, compared to prior art drive systems lacking such a design of the power unit configuration. Such an operational situation occurs where a vehicle is driven with the first locking means in a locked position, i.e. with a so-called locked planet, and where such locking means must be moved to the release position, as this is preferable in the operational situation that is prevailing in the vehicle. In this case, this may be achieved in an advantageous manner by controlling the power unit configuration, so that it achieves torque balance between the components that are locked together by the first locking means, and then moving such locking means into a release position when said torque balance prevails. Such an approach entails that the driver of the vehicle, a cruise control or other torque controlling function of the vehicle during the performance of the method is free to determine and change the torque transmitted to the power unit configuration over the vehicle's powertrain, via the planetary gear's output shaft.

According to one embodiment of the invention, the first electrical machine and/or the second electrical machine is controlled in step a) to achieve torque balance between the components, which are locked together by said first locking means. Accordingly, the requested torque balance may be achieved, in an advantageous manner, so that said first locking means may easily be moved to the release position, and the components comprised in the planetary gear are disconnected from each other.

According to another embodiment of the invention, the control of a vehicle is carried out with a power unit configuration comprising a combustion engine, and in step a) control of the combustion engine is implemented with an output shaft connected with the second electrical machine's rotor and/or the second electrical machine and the first electrical machine to achieve torque balance between the components which are locked together by said first locking means. Because of the existence of a second electrical machine in combination with a combustion engine in the vehicle's power unit configuration, in some operational situations, the vehicle's possibility of achieving said torque balance for the transition from the locked position to the release position is improved in an optimal manner, from an energy consumption perspective and/or emissions generation perspective.

According to another embodiment of the invention, control of a vehicle is implemented with a drive system further comprising a second locking means that may be moved between a locked position in which the combustion engine's output shaft is locked together with the second electrical machine's rotor and said first component, and a release position in which the combustion engine's output shaft is disconnected from the second electrical machine's rotor and said first component, and is allowed to rotate independently of these. Through the occurrence of such second locking means, the combustion engine may be disconnected from the planetary gear, and the vehicle's power-train and the vehicle may be driven purely electrically, but the invention also provides for the combustion engine's output shaft to be directly, permanently connected with the planetary gear's input shaft.

According to another embodiment of the invention, a vehicle, which has a power unit configuration comprising at least one electric energy storage means, arranged for exchange of electric power between the latter and the first and the second electrical machine, is controlled. By having at least one such energy storage means, the possibilities for said exchange of electric energy may be used when controlling the power unit configuration towards a requested torque balance.

"Electrical energy storage means" as used in this document means an energy storage means with an electrical interface in relation to the first and second electrical machine of the drive system, but storage of energy does not have to be electrical. This entails that in addition to an electrical battery and capacitor, for example flywheels, other mechanical means and means for building up pressure, e.g. pneumatic or hydraulic means, may be considered.

According to another embodiment of the invention, said second locking means are in a release position when the method is started, and in step a) the control of the first electrical machine and the second electrical machine is carried out in order to achieve torque balance between the components, which are locked together by said first locking means. Accordingly, at the occurrence of a combustion engine in the power unit configuration, said requested torque balance may be achieved also in case said second locking means are in a release position, i.e. when the combustion engine's output shaft is disconnected from the first component of the planetary gear, due to the existence of said at least one electrical energy storage means.

According to another embodiment of the invention step a) comprises control of exchange of electric power between, on the one hand, the first and/or second electrical machine and, on the other hand, said electric energy storage means, in order to achieve torque balance between the components, which are locked together by said first locking means. Accordingly, another embodiment of the invention, implemented in a vehicle with a power unit configuration comprising a said combustion engine, whose output shaft is connected with the second electrical machine's rotor when the method is started in step a), may comprise control of exchange of electric power between, on the one hand, the first and/or the second electrical machine, and, on the other hand, the electrical auxiliary units and/or loads in the vehicle, or electric energy storage means, if comprised in the power unit configuration. Such electric auxiliary aggregates and loads, such as a servo control device, may accordingly both consume and produce electric power.

According to another embodiment of the invention, said control of exchange of electric power occurs in step a), in such a way that power balance is achieved, wherein free selection, within the limitations generally specified for the drive system, of charge current to or discharge current from said electric energy storage means, and/or electric auxiliary units, and/or loads occurs in accordance with the prevailing operational situation in the vehicle. The term power balance means that it is possible, within the general limitations specified for the drive system, to freely to select the charge current to or the discharge current from the energy storage means, if applicable, and/or electric auxiliary units, and/or loads in the vehicle at existing operating modes, which is naturally very advantageous at control towards torque balance in the planetary gear, since this may be selected in the manner being most advantageous in each specific case.

According to another embodiment of the invention, where needed, the maintenance of power balance is temporarily waived while control is implemented in step a). This may be because the combustion engine is not able to build up torque quickly enough to meet the output requirement, or because the latter is greater than what the combustion engine is able to provide. The abandonment of the objective of maintaining power balance entails that the electric energy storage means must deliver a current to the first electrical machine, and/or the electric auxiliary unit, and/or loads in the vehicle, which is usually possible, if not desirable.

According to another embodiment of the invention, the method is implemented in a vehicle with a said drive system, wherein the planetary gear's sun wheel is said first component, and the ring gear is said third component. By connecting the first electrical machine's rotor with the ring gear and the combustion engine's output shaft with the sun wheel, a compact construction is achieved, which is easy to fit into already existing spaces for powertrains (drive systems) with clutch mechanisms instead of planetary gears.

According to another embodiment of the invention, the method is implemented in a vehicle with a gearbox having an input shaft, which is connected with said second output shaft in the planetary gear. Via the inventive method, the shift of said first locking means from a locked position to a release position may be achieved without any torque interruption, and with a potential for the driver of the vehicle to maintain or change the torque transmitted by the power unit configuration to the vehicle's power-train.

The invention also relates to a computer program product and an electronic control device.

Other advantageous features and advantages with the invention are set out in the description below.

BRIEF DESCRIPTION OF THE DRAWINGS

Below are descriptions of an example embodiment of the invention with reference to the enclosed drawings, in which.

DETAILED DESCRIPTION OF THE DRAWINGS

Figure 1:
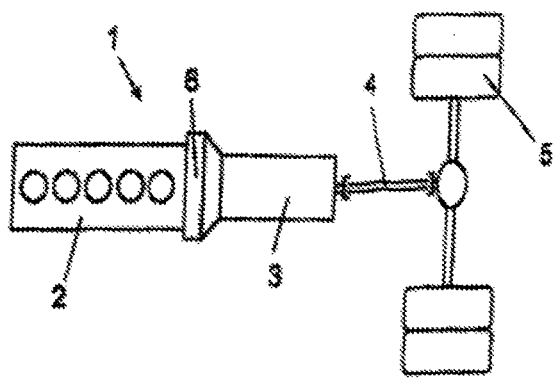
FIG. 1 is a very simplified view of a power-train in a vehicle that may be equipped with a drive system for the performance of a method according to the invention.
Figure 2:
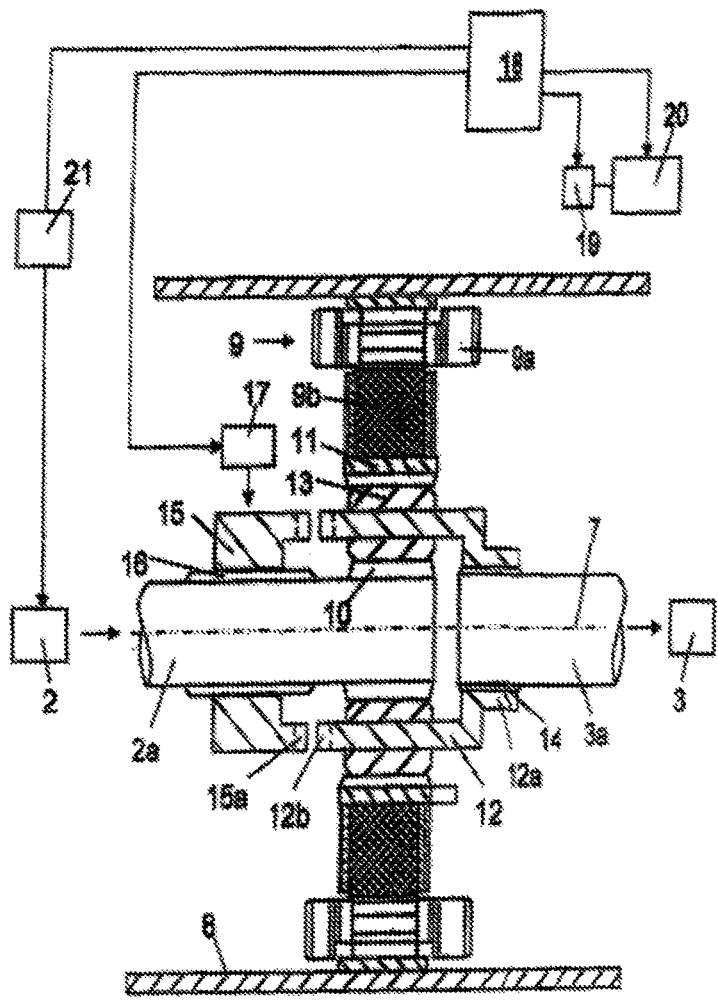
FIG. 2 is a more detailed, but still simplified view of a part of said drive system.

FIG. 1 shows a power-train for a heavy goods vehicle 1. The powertrain comprises a combustion engine 2, a power transmission 3 in the form of for example a speed gearbox, a continuously variable transmission (CVT), or a direct transmission, a number of driving shafts 4 and driving wheels 5. Between the combustion engine 2 and the gearbox 3 the powertrain comprises an intermediate section 6. FIG. 2 shows a part of the components in the intermediate section 6 in more detail, more specifically those which also occur in prior art drive systems, such as the one according to SE 536 329. The combustion engine 2 is equipped with an output shaft 2a, and the gearbox 3 with an input shaft 3a, in the intermediate section 6. The output shaft 2a of the combustion engine is coaxially arranged in relation to the input shaft 3a of the gearbox. The combustion engine's output shaft 2a and the input shaft 3a of the gearbox are rotatably arranged around a common rotation axis 7. The intermediate section 6 comprises a house 8, enclosing a first electrical machine 9 and a planetary gear. The electrical machine 9 comprises, in a customary manner, a stator 9a and a rotor 9b. The stator 9a comprises a stator-core, which is fixed in a suitable manner on the inside of the house 8. The stator core comprises the stator's windings. The first electrical machine 9 is adapted, under certain operating circumstances, to use stored electrical energy to supply driving force to the input shaft 3a of the gearbox, and, under other operating conditions, to use the kinetic energy of the input shaft 3 of the gearbox to extract and store electric energy.

The planetary gear is arranged substantially radially inside of the electrical machine's stator 9a and rotor 9b. The planetary gear comprises, in a customary manner, a sun wheel 10, a ring gear 11 and a planetary wheel carrier 12. The planetary wheel carrier 12 supports a number of cogwheels 13, which are rotatably arranged in a radial space between the teeth of the sun wheel 10 and the ring gear 11. The sun wheel 10 is fixed on a peripheral surface of the combustion engine's output shaft 2a. The sun wheel 10 and the combustion engine's output shaft 2a rotate as one unit with a first speed $n_1$. The planetary wheel carrier 12 comprises an attachment section 12a, which is attached on a peripheral surface of the input shaft 3a of the gearbox with the help of a splines-joint 14. With the help of this joint, the planetary wheel carrier 12 and the gearbox's input shaft 3a may rotate as one unit with a second speed $n_2$. The ring gear 11 comprises an external peripheral surface on which the rotor 9b is fixedly mounted. The rotor 9b and the ring gear 11 constitute one rotatable unit which rotates at a third speed $n_3$.

The drive system comprises a first locking means, since the combustion engine's output shaft 2a is equipped with a shiftable clutch element 15. The clutch element 15 is mounted on the combustion engine's output shaft 2a with the help of a splines-joint 16. The clutch element 15 is in this case arranged in a twist-fast manner on the combustion engine's output shaft 2a, and is shiftably arranged in an axial direction on the combustion engine's output shaft 2a. The clutch element 15 comprises a clutch section 15a, which is connectible with a clutch section 12b in the planetary wheel carrier 12. A schematically displayed shifting element 17 is adapted to shift the clutch element 15 between a first position where the clutch sections 15a, 12b are not in engagement with each other, corresponding to a release position in the first locking means, and a second position where the clutch sections 15a, 12b are in engagement with each other, corresponding to a locked position of the first locking means. In such locked position the combustion engine's output shaft 2a and the gearbox's input shaft 3a will be locked together, and accordingly these and the electrical machine's rotor will rotate at the same engine speed. This state may be referred to as a locked planet. The locking mechanism may also advantageously have the design described in the Swedish patent application SE 536 559, and comprise a sleeve equipped with first splines, which in the release position engage with second splines on a first component of the planetary gear, and which in the locked position engage with a third splines on a second component of the planetary gear. In this case the first component is preferably the planetary wheel carrier, and the second component is the sun wheel. The locking mechanism may then be adapted like an annular sleeve, enclosing the planetary wheel carrier substantially concentrically. The locking means may also be made of a suitable type of friction clutch.

An electronic control device 18 is adapted to control the shifting element 17. The control device 18 is also adapted to determine the occasions on which the electrical machine should operate as an engine, and the occasions on which it should operate as a generator. In order to so determine, the control device 18 may receive up to date information relating to suitable operating parameters. The control device 18 may be a computer with software for this purpose. The control device 18 controls a schematically displayed control equipment 19, which controls the flow of electric energy between a hybrid battery 20 and the stator windings 9a of the electrical machine. On occasions where the electrical machine 9 operates as an engine, stored electric energy is supplied from the hybrid battery 20 to the stator 9a. On occasions where the electrical machine operates as a generator, electric energy is supplied from the stator 9a to the hybrid battery 20. The hybrid battery 20 delivers and stores electric energy with a voltage in the range of 300-900 Volt. Since the intermediate section 6 between the combustion engine 2 and the gearbox 3 in the vehicle is limited, the electrical machine 9 and the planetary gear must constitute a compact unit. The planetary gear's components 10, 11, 12 are arranged substantially radially inside the electrical machine's stator 9a. The rotor 9b of the electrical machine, the ring gear 11 of the planetary gear, the combustion engine's output shaft 2a and the input shaft 3a of the gearbox, are here rotatably arranged around a common rotation axis 5. With such an embodiment the electrical machine 9 and the planetary gear occupy a relatively small area. The vehicle 1 is equipped with an engine control function 21, with which the engine speed $n_1$ and/or torque of the combustion engine 2 may be controlled. The control device 18 accordingly has the possibility of activating the engine control function 21 and of creating a substantially zero torque state in the gearbox 3 at engagement and disengagement of gears in the gearbox 3. Naturally, the drive system may, instead of being controlled by one single control device 18, be controlled by several different control devices.

The part of a drive system of a vehicle, thus far described, and displayed in FIG. 2, and on which a method according to the invention may be implemented, is extant in the drive system according to SE 536 329. Below, a part of the drive system, which may be added to this part for the implementation of the invention, will be described with reference to FIG. 3.

The drive system, specifically the intermediate section 6, also has a second electrical machine 30 with a stator 31, with stator windings and a rotor 32 which is connected with the output shaft 2a of the combustion engine. A second locking means 33, which may have a similar design as the first locking means 34, illustrated in more detail in FIG. 2, is adapted to separate, in a release position, a first part 35 of the combustion engine's output shaft, arranged nearest the combustion engine, from a second part 36 thereof, connected with the sun wheel 10 of the planetary gear, so that the second electrical machine's rotor 32 and the sun wheel 10 are allowed to rotate independently of the first section 35 of the combustion engine's output shaft. The second locking means may be moved to a locked position, in which both the parts 35, 36 of the combustion engine's output shaft are locked together, and accordingly the first part 35 is locked together with the second electrical machine's rotor. The control device 18 is adapted to control fuel supply to the combustion engine 2 and to control exchange of electric energy between the first electrical machine 9 and the second electrical machine 30 on the one hand, and, on the other hand, electric energy storage means, if applicable, such as batteries and electric auxiliary units and loads in the vehicle, such as servo control devices, pumps, cooling units and similar.

By way of the added arrangement of the electrical machine 30 and the second locking means 33, a range of positive features is achieved in the drive system, but it should be pointed out again that the occurrence of the second locking means and the combustion engine in the power unit configuration is not necessary to realize the method according to the invention. If the vehicle is driven with the first locking means 34 in a locked position, and for example the second locking means 33 in a locked position, and a request arises for shifting the first locking means 34 into a release position, the power unit configuration is controlled towards a torque balance between the components that are locked together, i.e. the planetary wheel carrier 12 and the sun wheel 10, via the first locking means 34. This may be achieved by controlling the first electrical machine 9, and at least one of the second electrical machine 30 and the combustion engine 2, since the second locking means 33 is in a locked position, towards said torque balance, so that there is also a possibility for energy storage in the hybrid battery 30 if desired. Here, torque balance is achieved when the following relation between the torques applied is met for the example configuration displayed in FIG. 3:

$$T_{sun\ wheel} = \frac{Z_s}{Z_r} T_{ring\ gear}$$

where $T_{sun\ wheel}$ and $T_{ring\ gear}$ represent the torque applied to the sun wheel and the ring gear, respectively, where $T_{sun\ wheel} = T_{ice} + T_{em2}$ and $T_{ring\ gear} = T_{em1}$ where $T_{ice}$ is torque applied to the combustion engine's output shaft
$T_{em2}$ is torque applied via the second electrical machine's stator to its rotor,
$T_{em1}$ is torque applied via the first electrical machine's stator to its rotor,
$Z_s$ is the number of teeth on the sun wheel,
$Z_r$ is the number of teeth on the ring gear.

Accordingly, torque balance relates to the state where a torque acts on a ring gear arranged in the planetary gear, representing the product of the torque acting on the planetary wheel carrier of the planetary gear and the gear ratio of the planetary gear, while simultaneously a torque acts on the planetary gear's sun wheel, representing the product of the torque acting on the planetary wheel carrier and (1 minus the planetary gear's gear ratio). At such torque balance, said first locking means 34 does not transfer any torque between the components of the planetary gear. Once torque balance has been achieved, the first locking means 34 may easily be moved to the release position, so that the planetary gear's components are no longer locked together. The inventive method facilitates a transition of the first locking means from the locked position to the release position, without any torque interruption in the vehicle's powertrain, and with freedom for the vehicle's driver, cruise control or other torque controlling function in the vehicle to determine and change the powertrain torque during the method. One of several operational situations in the vehicle, at which such a release of the first locking means may be desirable, is the case of braking the vehicle, which initially drives e.g. at a speed of approximately 50 km/h with the combustion engine running. Torque balance may in such a case be achieved in the planetary gear without the total braking torque needing to be reduced, or only requiring a minor reduction, i.e. substantially the same total braking torque may be maintained when the first locking means are shifted to the release position, and the combustion engine is controlled to its idling speed. The maximum braking torque that may be achieved depends, on the one hand, on the size of the respective electrical machines, and, on the other hand, on the relative sizes of the first and the second electrical machines.

Figure 3:
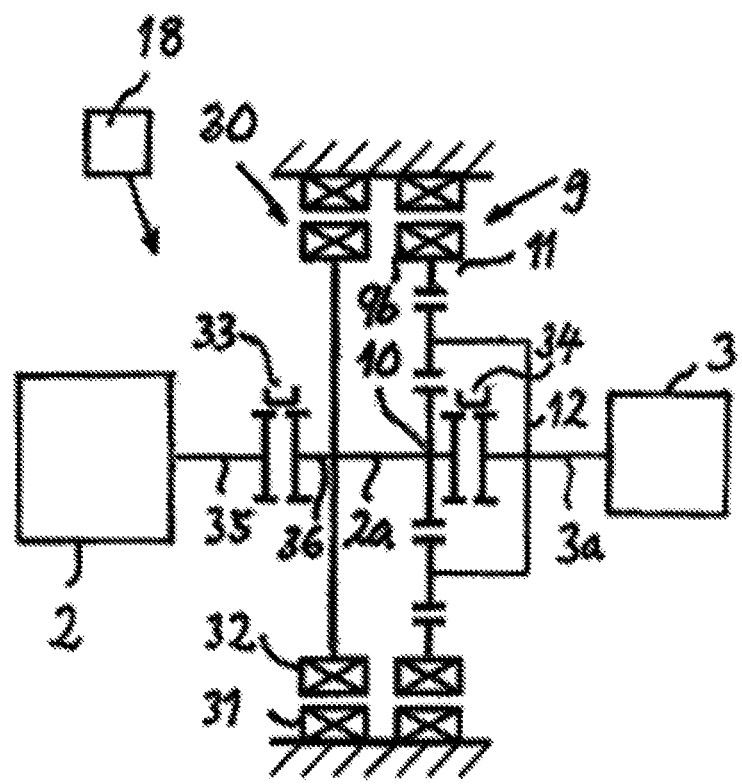
FIG. 3 is a simplified view, illustrating the general structure of a drive system in a vehicle, for which a method according to one embodiment of the invention is carried out.

A great advantage of a drive system according to FIG. 3, with or without the second locking means, is the potential for continuous electric power supply by the electric units in all operating modes, with the combustion engine connected in a steady state. This is normally not achieved with hybrid solutions having only one electrical machine. When the first locking means is in a locked position, said electric unit is supplied by substantially distributing the requested electrical output to the electric auxiliary aggregates and the electric loads of the vehicle between the electrical machines. In this way, the losses in the electrical machines are minimize, since the torque per electrical machine is halved compared to if an electrical machine had supplied all the electrical output. Since the loss effects of the electrical machines substantially scale against the torque applied squared, this entails substantially a halving of the losses of the electrical machines. However, such a distribution (50/50) is potentially not optimal in the case that the two electrical machines have dimensions which differ considerably from each other, but efforts are still made to select said proportions with this optimal distribution in mind.

When the first locking means is open, the first electrical machine will determine the torque in the powertrain. The engine speed of the combustion engine is controlled to an operational point, which is selected by minimizing the losses of the combustion engine together with losses of the electrical machine and the inverter. The second electrical machine is then used to balance the output for potential energy storage means, electrical aggregates and the first electrical machine. It is a great strength that the power supply of the electrical aggregates may take place, even if the vehicle is not equipped with an electrical energy storage system. The supply may also take place continuously during all types of up- and down-shifts, during crawling, start-off and braking. All driving modes, except electrical driving and brake regeneration, may be implemented without any electrical storage means or with a defective energy storage means. In operating modes, with or without a defective electrical energy storage means, the voltage of the second electrical machine normally will be controlled to maintain the correct voltage level on the DC-link (supply voltage to the two inverters connected to the stators of the electrical machines). It is also conceivable that the voltage of the first electrical machine may be controlled in some cases. Voltage control is a "mode" of the inverter, where a voltage is requested from the inverter. The inverter then controls the electrical machine's torque in such a way that the requested voltage is maintained on the inverter's supply side.

Figure 4:
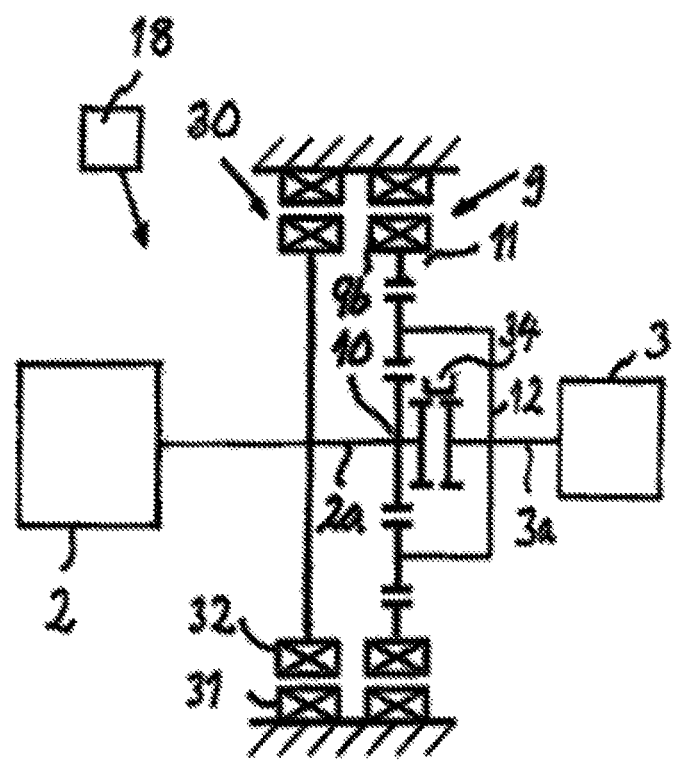
FIG. 4 is a simplified view, illustrating the general structure of another drive system in a vehicle, for which a method according to one embodiment of the invention is carried out.
Figure 5:
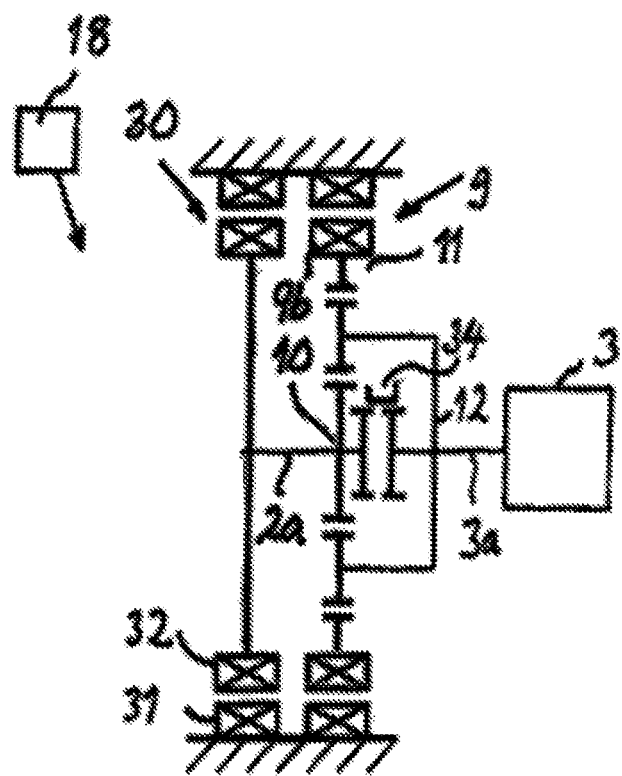
FIG. 5 is a simplified view, illustrating the general structure of another drive system in a vehicle, for which a method according to one embodiment of the invention is carried out.

FIG. 4 shows, in a simplified way, a drive system, which differs from the one according to FIG. 3, since the combustion engine 2 is permanently connected with the second electrical machine's rotor 32, while FIG. 5 shows, in a simplified way, a drive system which entirely lacks a combustion engine. Embodiments of the inventive method may be carried out in vehicles with these alternative drive systems.

Figure 6:
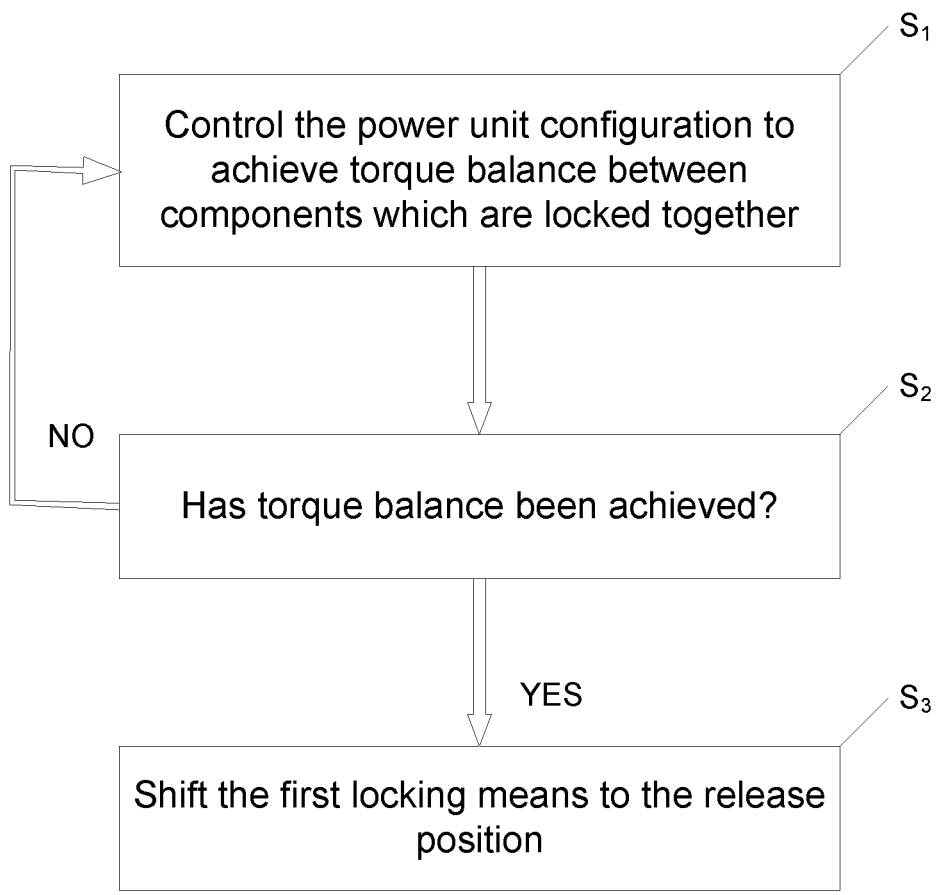
FIG. 6 is a flow chart showing a method according to one embodiment of the invention.

FIG. 6 illustrates a flow chart of a method according to one embodiment of the present invention, implemented in a vehicle with a drive system of the type displayed in FIG. 3. It is assumed that the vehicle is driven with the first locking means in a locked position. The method is then started in a first step $S_1$, by controlling the power unit configuration to achieve torque balance between components that are locked together, which, in the case of the second locking means 33 in a locked position, may be achieved by controlling the combustion engine and/or the second electrical machine and the first electrical machine, and in the case of the second locking means in a release position, by controlling the first and the second electrical machines toward torque balance of the components locked together. Subsequently, in a step $S_2$, a question is asked as to whether torque balance has been achieved, and if the answer to this question is "yes", the first locking means are moved to a release position in a step $S_3$, via control of the shifting element 17 in the embodiment according to FIG. 2.

Computer program code for implementation of a method according to the invention is suitably included in a computer program, which is loadable into the internal memory of a computer, such as the internal memory of an electronic control device of a vehicle. Such a computer program is suitably provided via a computer program product, comprising a non-transitory data storage medium readable by an electronic control device, wherein the non-transitory data storage medium has the computer program stored thereon. Said non-transitory data storage medium is e.g. an optical data storage medium in the form of a CD-ROM, a DVD, etc., a magnetic data storage medium in the form of a hard disk drive, a diskette, a cassette, etc., or a Flash memory or a ROM, PROM, EPROM or EEPROM type memory.

Figure 7:
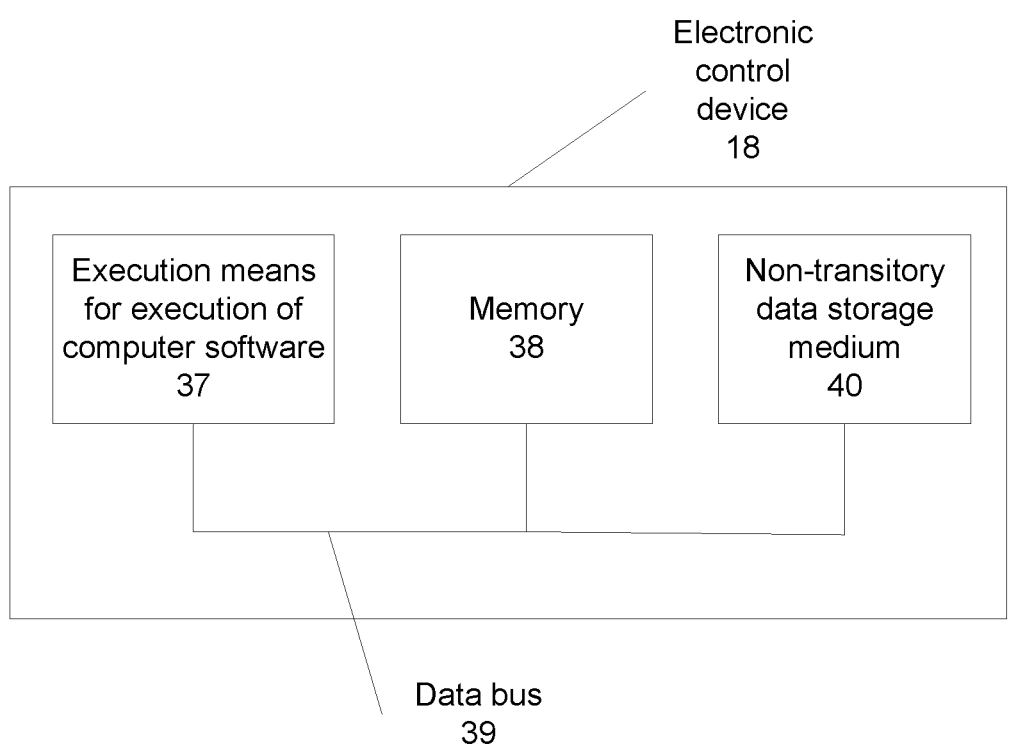
FIG. 7 is a fundamental diagram of an electronic control device for implementation of one or several methods according to the invention.

FIG. 7 very schematically illustrates an electronic control device 18, comprising execution means 37, such as a central processor unit (CPU), for the execution of computer software. The execution means 37 communicates with a memory 38, e.g. a RAM memory, via a data bus 39. The control device 18 also comprises a durable data storage medium 40, e.g. in the form of a Flash memory or a ROM, PROM, EPROM or EEPROM type memory. The execution means 37 communicates with the data storage means 40 via the data bus 39. A computer program comprising computer program code for the implementation of a method according to the invention is stored on the data storage medium 40.

The invention is obviously not limited in any way to the embodiments described above, but numerous possible modifications thereof should be obvious to a person skilled in the area, without such person departing from the spirit of the invention as defined by the appended claims.

For example, the inventive method may be carried out in a vehicle with a power unit configuration lacking a combustion engine, i.e. which is powered purely electrically by the two electrical machines. In such a case, the power unit configuration must have at least one electric energy storage, but where there is a combustion engine, it is not necessary for the power unit configuration to have such an electric energy storage.

The inventive method could be carried out in a vehicle with a drive system, which has the planetary gear's ring gear as said first component and the sun wheel as said third component, which means that the first electrical machine's rotor would be connected with the planetary gear's sun wheel, and the second electrical machine's rotor and the combustion engine, if applicable, would be connected with the planetary gear's ring gear instead of with the sun wheel. Advantageously, however, the planetary gear's output shaft for transmission of torque for the vehicle's propulsion is connected with the planetary wheel carrier.

It is not necessary for the output shaft from the planetary gear to be an input shaft in a gearbox. Instead, the vehicle could have no gearbox.

The invention claimed is:

1. A method for controlling a vehicle with a drive system comprising a power unit configuration adapted to provide power to operate the vehicle, a planetary gear comprising three components in the form of a sun wheel, a ring gear and a planetary wheel carrier, wherein a first input shaft in the planetary gear is connected with a first of said components of the planetary gear, so that a rotation of such shaft leads to a rotation of such first of said components, wherein a second output shaft of the planetary gear, for transmission of torque for the propulsion of the vehicle, is connected with a second of said components in the planetary gear, so that a rotation of such shaft leads to a rotation of such second of said components, wherein the power unit configuration comprises a first electrical machine with a stator and a rotor, which is connected with a third of said components of the planetary gear, so that a rotation of the rotor leads to a rotation of such third of said components, and wherein the drive system also comprises a first locking means, which may be moved between a locked position in which two of said components are locked together so that the three components rotate with the same speed, and a release position in which the components are allowed to rotate with different speeds, wherein the vehicle comprises said power unit configuration, which also comprises a second electrical machine with a stator and a rotor connected with said input shaft of the planetary gear, which is being controlled, and wherein the method comprises the following operations in order to, when the vehicle is driven with the first locking means in a locked position, move such locking means to the release position, wherein said method comprises:
 a) controlling said power unit configuration, in order to achieve torque balance between the components locked together by said first locking means; and
 b) shifting said first locking means to a release position when said torque balance prevails.

2. The method according to claim 1, wherein in step a), the first electrical machine and/or the second electrical machine is controlled to achieve torque balance between the components, which are locked together by said first locking means.

3. The method according to claim 1, wherein the vehicle comprises a power unit configuration comprising a combustion engine, and that in step a) control of the combustion engine, having an output shaft thereof connected with the rotor of the second electrical machine and/or the second electrical machine and the first electrical machine, is implemented to achieve torque balance between the components, which are locked together by said first locking means.

4. The method according to claim 3, wherein the drive system further comprises a second locking means, which may be moved between a locked position, in which the combustion engine's output shaft is locked together with the second electrical machine's rotor and said first of said components, and a release position, in which the combustion engine's output shaft is disconnected from the second electrical machine's rotor and said first of said components, and is allowed to rotate independently of these.

5. The method according to claim 1 wherein the vehicle comprises a power unit configuration comprising at least one electric energy storage means, arranged for exchange of electric power between the latter and the first and the second electrical machine.

6. The method according to claim 4, wherein the second locking means is in a release position when the method is started, and that in step a) control of the first electrical machine and the second electrical machine is implemented in order to achieve torque balance between the components, which are locked together by said first locking means.

7. The method according to claim 6, wherein step a) comprises control of exchange of electric power between the first and/or the second electrical machine on the one hand, and, on the other hand, said electric energy storage means, in order to achieve torque balance between the components, which are locked together by said first locking means.

8. The method according to claim 3, wherein the output shaft of the combustion engine is connected with the second electrical machine's rotor when the method is started, and that step a) comprises control of exchange of electric power between the first and/or second electrical machine on the one hand, and on the other hand, electrical auxiliary units and/or loads and/or electric energy storage means if included in the power unit configuration of the vehicle.

9. The method according to claim 7, wherein the control of exchange of electric power in step a) takes place in order to achieve power balance, wherein a free selection occurs, within the general limitations specified for the drive system, of charge current to or discharge current from electrical auxiliary units and/or loads and/or said electric energy storage means, if included in the power unit configuration, in accordance with the prevailing operational situation of the vehicle.

10. The method according to claim 9, wherein the maintenance of power balance is temporarily waived where needed, when the control is implemented in step a).

11. The method according to claim 1 wherein the planetary gear's sun wheel is said first of said components and its ring gear is said third of said components.

12. The method according to claim 1 wherein the vehicle comprises a gearbox with an input shaft, which is connected with said second output shaft of the planetary gear.

13. A computer program product for controlling a vehicle, wherein said vehicle comprises a drive system comprising a power unit configuration adapted to provide power to operate the vehicle, a planetary gear comprising three components in the form of a sun wheel, a ring gear and a planetary wheel carrier, wherein a first input shaft in the planetary gear is connected with a first of said components of the planetary gear, so that a rotation of such shaft leads to a rotation of such first of said components, wherein a second output shaft of the planetary gear, for transmission of torque for the propulsion of the vehicle, is connected with a second of said components in the planetary gear, so that a rotation of such shaft leads to a rotation of such second of said components, wherein the power unit configuration comprises a first electrical machine with a stator and a rotor, which is connected with a third of said components of the planetary gear, so that a rotation of the rotor leads to a rotation of such third of said components, and wherein the drive system also comprises a first locking means, which may be moved between a locked position in which two of said components are locked together so that the three components rotate with the same speed, and a release position in which the components are allowed to rotate with different speeds, wherein the vehicle comprises said power unit configuration, which also comprises a second electrical machine with a stator and a rotor connected with said input shaft of the planetary gear, which is being controlled, and wherein the computer program product is stored in a non-transitory computer-readable medium and comprises computer-readable program code portions embodied therein, the computer-readable program code portions configured to, when the vehicle is driven with the first locking means in a locked position, move such locking means to the release position, wherein the executable portion comprises computer code to cause an electronic processor to:

a) control said power unit configuration, in order to achieve torque balance between the components locked together by said first locking means; and b) shift said first locking means to a release position when said torque balance prevails.

14. An electronic control device for controlling a vehicle, wherein said vehicle comprises a drive system comprising a power unit configuration adapted to provide power to operate the vehicle, a planetary gear comprising three components in the form of a sun wheel, a ring gear and a planetary wheel carrier, wherein a first input shaft in the planetary gear is connected with a first of said components of the planetary gear, so that a rotation of such shaft leads to a rotation of such first of said components, wherein a second output shaft of the planetary gear, for transmission of torque for the propulsion of the vehicle, is connected with a second of said components in the planetary gear, so that a rotation of such shaft leads to a rotation of such second of said components, wherein the power unit configuration comprises a first electrical machine with a stator and a rotor, which is connected with a third of said components of the planetary gear, so that a rotation of the rotor leads to a rotation of such third of said components, and wherein the drive system also comprises a first locking means, which may be moved between a locked position in which two of said components are locked together so that the three components rotate with the same speed, and a release position in which the components are allowed to rotate with different speeds, wherein the vehicle comprises said power unit configuration, which also comprises a second electrical machine with a stator and a rotor connected with said input shaft of the planetary gear, which is being controlled, wherein said electronic device comprises:

a storage device;

an electronic processor operatively coupled to the storage device; and a computer program product stored in a non-transitory computer-readable medium on the storage device and comprising computer-readable program code portions embodied therein, the computer-readable program code portions configured to, when the vehicle is driven with the first locking means in a locked position, move such locking means to the release position, wherein the executable portion comprises computer code to cause an electronic processor to:

a) control said power unit configuration, in order to achieve torque balance between the components locked together by said first locking means; and
b) shift said first locking means to a release position when said torque balance prevails.

* * * * *